Patented Feb. 17, 1948

2,436,363

UNITED STATES PATENT OFFICE 2,436,363

AMINOAMIDE RESINS

Carl Shipp Marvel, Urbana, Ill.

No Drawing. Application January 19, 1944,
Serial No. 518,884

1 Claim. (Cl. 260—72)

This invention relates to resinous compositions. More particularly it relates to resinous condensation products.

This invention has as an object the preparation of novel resinous condensation products of formaldehyde and aminoacid amides. A further object is the preparation of materials suited for use in coating compositions, molding compositions, textile treatment, etc. Other objects will appear hereinafter.

These objects are accomplished by the following invention wherein the primary amide of a monobasic acid, preferably aliphatic, having a primary amino group as its only substituent is reacted with approximately two moles, per mole of aminoamide, of formaldehyde.

The more detailed practice of the invention is illustrated by the following examples, wherein parts given are by weight. There are, of course, many forms of the invention other than these specific embodiments.

Example I

A mixture comprising 7.4 parts of glycinamide and 16.25 parts of formalin which contains 37% formaldehyde was allowed to stand at room temperature for one-half hour. Formation of a soluble resin occurred readily as evidenced by a rapid increase in the viscosity of the solution. Air dried films obtained from this resin solution were hard and scratch resistant, and when thoroughly dried were substantially insensitive to water. Similarly, hard, scratch resistant films of the glycinamide-formaldehyde resin were produced by baking for one hour at 127° C.

Filled molding compositions were prepared by mixing the resin solution, prepared as described above, with five parts of spruce wood flour. The mixture was dried and shaped moldings prepared by heating in a die under pressure. Attractive molded articles were obtained in this manner.

Plywood prepared by coating birch veneer with the glycinamide/formalin mixture and uniting a number of plies was dried and then heated at about 125° C. for forty minutes under pressure. The plywood thus obtained had strongly bonded plies.

Example II

When glycinamide hydrochloride was used to replace the glycinamide in the process described above, the reaction proceeded rapidly to yield a gelatinous material which liquefied on prolonged heating and from which somewhat dark, rather brittle films were formed by baking. These films were found to be somewhat more water sensitive than films obtained from glycinamide and formaldehyde as described above.

Small amounts of mineral acid such as hydrochloric acid, or acid generating substances, may be employed to accelerate formation of the resin from glycinamide and formaldehyde. Gelled resinous products are obtained when the condensation is carried out at slightly elevated temperatures, i. e., 40° to 80° C. The solid resin obtained by drying these gels is useful as a molding powder.

Example III

A glycinamide resin was prepared by heating 7.4 parts of glycinamide, 6 parts of paraformaldehyde and 40 parts of butanol at approximately 100° C. for one hour. This resin solution may be used directly as a textile finish or as a coating composition. Films of glycinamide/formaldehyde/butanol resin, prepared by baking this resin solution at 127° C. for one hour, were pale yellow in color and resistant to scratching and marring even when hot.

Example IV

A mixture consisting of 29 parts of 12-aminostearamide, 17.9 parts of formalin, 10 parts of water and 45 parts of butanol was adjusted to a pH of 8.4 with dilute sodium hydroxide solution. After refluxing over 40 minutes, one part of phthalic anhydride dissolved in a mixture of toluene and butanol was added and the butanol-water binary distilled, separated, and the butanol returned to the reaction mixture. When the temperature of the mixture reached 105° C., the mixture was filtered. Films cast from the resulting solution, after baking for one hour at 127° C., were soft, rubber-like and tough.

Example V

When the above procedure was employed using 2-aminostearamide in place of the 12-aminostearamide, glossy, soft, baked films were obtained from the resin/butanol solution.

Example VI

A mixture of 15 parts of urea and 50 parts of formalin was adjusted to a pH of 8.8, and 6 parts of 12-aminostearamide and 50 parts of butanol were added. This mixture was refluxed for one-half hour and one part of phthalic anhydride dissolved in a mixture of toluene and butanol was then added. The water-butanol binary was removed by distillation and the butanol returned to the reaction mixture. When the temperature of the reaction mixture reached 109° C., heating was discontinued. Films cast from this resin solution, after baking for approximately one hour at 127° C., were markedly less brittle than controls prepared by the same procedure from urea alone.

Although formaldehyde is a preferred ingredient in the practice of this invention, any material which releases formaldehyde in solution, such as paraformaldehyde, trioxane and various N-polymethylol compounds can be employed. Although the molar ratio of formaldehyde to aminoamide may vary from between 1 and 4, it is preferred to use a ratio of approximately 1 mol of aminoamide to 2 mols of formaldehyde. However, for certain uses, for example, the preparation of modified films, less formaldehyde, e. g., a ratio of 1 to 1.5, is preferred.

The aminoamides contemplated by this invention are those derived from monobasic acids which have at least two carbon atoms, contain a primary carbonamide —$CONH_2$ group, and have at least one amino group attached to a carbon which is joined to another carbon atom by a single bond.

Thus, to be effective in the formation of thermosetting resins, the nitrogen atoms of the amino and amide groups must each be attached to two hydrogen atoms. It is also preferred that the aminoamides be free from other reactive groups, although such unreactive substituents as halogen, alkyl, aryl, aralkyl, or cyano groups may be present on the carbon atoms of the aminoamides.

In addition to the aminoamides described in the examples above, others, such as aminobenzamides, alpha- and epsilon-aminocaproamides, 2-aminopropionamide, 3-aminopropionamide, aminobutyramides, etc., can be used. When the beta-aminoamides are used, high temperatures for the condensation should be avoided.

In addition to the preparation of aminoamide/formaldehyde resins in conjunction with urea/formaldehyde resin as described in the examples above, the aminoamide/formaldehyde resin can be prepared in the presence of a phenol or melamine to give a modified resin. Such modified resins in general are tougher and less brittle than unmodified urea/formaldehyde, phenol/formaldehyde, or melamine/formaldehyde resins.

The condensation may be carried out under acid, alkaline or neutral conditions. As indicated in the above examples, the properties of the resulting polymer are dependent upon the pH of the condensation mixture. In general, a pH of 3.2 to 5.0 is preferred for the condensation when a rapid condensation reaction is desired.

The aminoamide/formaldehyde resins prepared as described above are useful as coating compositions, as binders for plywood or in the production of plastic materials such as with wood flour or cellulosic fillers and for the treatment of fabrics. The resins are also useful as modifiers for thermosetting compositions such as urea/formaldehyde or phenol/formaldehyde resins.

The above description and examples are intended to be illustrative only. Any modification of or variation therefrom which conforms to the spirit of the invention is intended to be included within the scope of the claim.

What is claimed is:

Process of obtaining resins which consists in bringing into contact reaction ingredients consisting of formaldehyde with one mol, per two mols of formaldehyde, of glycinamide in the form of the free base.

CARL SHIPP MARVEL.

REFERENCES CITED

The following references are of record in the file of this patent:

UNITED STATES PATENTS

| Number | Name | Date |
|---|---|---|
| 2,331,377 | D'Alelio | Oct. 12, 1943 |
| 2,341,266 | D'Alelio | Feb. 8, 1944 |

OTHER REFERENCES

Marvel et al., Modern Plastics, Oct., 1943, pp. 112 and 148.